Jan. 8, 1929.

W. LA HODNY 1,698,307

MIRROR

Filed April 5, 1927

Inventor
William La Hodny
By Popp & Powers
Attorneys

Patented Jan. 8, 1929.

1,698,307

UNITED STATES PATENT OFFICE.

WILLIAM LA HODNY, OF BUFFALO, NEW YORK, ASSIGNOR TO STANDARD MIRROR COMPANY INC., OF BUFFALO, NEW YORK, A CORPORATION OF NEW YORK.

MIRROR.

Application filed April 5, 1927. Serial No. 181,254.

This invention relates to a mirror which is more particularly intended for use in automobiles and similar situations where it is desired to observe the condition of the road in rear of the car, although the same may also be used to advantage in other installations.

As is well-known, the mirrors now commonly in use on automobiles for this purpose possess such high reflecting capacity that the driver is liable to become blinded by the glare of the light emanating from the lamps of an automobile in the rear and this often results in accidents and injury to persons and property.

It is the object of this invention to provide a rear view mirror which can be produced at very low cost and which has the capacity of reflecting an image sufficiently bright and clear of what is transpiring on the road in rear of the car, so as to enable the driver to govern his actions accordingly, and yet is not so bright that the light which is reflected from the rear of the car into the eyes of a driver will produce a blinding effect which might result in dangerous traffic conditions.

With this object in view this invention consists generally in providing the transparent body of the mirror with a light porous, transparent, reflective coating and associating with the same an opaque coating so that the image is moderately reflected by this light porous coating and part of the image is permitted to pass through this light porous coating and be absorbed by the opaque backing.

In the accompanying drawings:—

Figure 1:
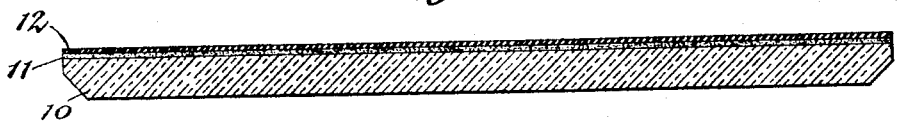
Figure 1 is a sectional view of a mirror containing one embodiment of my invention.
Figure 2:
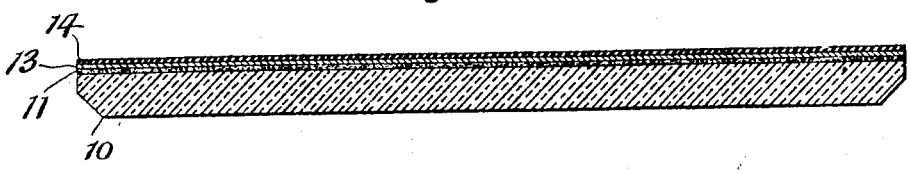
Figure 2 is a similar view showing a modified form of my invention.

In Figures 1 and 2 of the drawing, the numeral 10 represents the transparent body of the mirror which is preferably constructed of a plate of glass which is suitably polished in the manner well-known in this art.

In the form of my invention shown in Fig. 1, a coating 11 of light porous, reflective material preferably silver is applied to the rear of the transparent body 10. This reflective material may be deposited or applied to the rear of the transparent body by precipitation in the usual manner, and this deposit is so thin that the same in effect operates in the manner of a fine screen or veil which will reflect only a part of the light which strikes the same, while other parts of this light will pass through this reflective film as though it were an exceedingly fine meshed screen.

After the deposit of the light porous reflective material has been effected on the rear of the glass body and this material has become set, an opaque coating or backing 12 of any suitable colored pigment is applied to the rear side of the reflective film 10. This backing operates to hold the reflective film against the rear side of the transparent plate and prevents the mirror from becoming injured and this backing is also visible in a modified form through this reflective film from the front side of the mirror, whereby the rays of light which are not reflected by the reflective film but pass through the latter are absorbed by the backing and thus modify the brilliancy of the reflected light and render the same less glaring upon striking the eyes of the person looking into the mirror.

The pigment used as the backing for holding the reflective film in place and also absorbing some of the light so as to render the mirror non-glaring may be varied to meet different conditions under which the rear view mirror is used, a bright pigment being used for the opaque backing when only a moderate reduction in the reflecting capacity of the mirror is desired, while a darker color is employed when it is desired to cut down the reflecting capacity of the mirror to a considerable extent.

A mirror constructed in accordance with the foregoing explanation is capable of being produced at very low cost in view of the fact that only a small quantity of silver is employed and therefore permits of a more extensive use of such mirrors and reducing the hazards of automobile traffic.

In order to reduce the liability of injuring the reflective porous coating of silver on the rear side of the mirror, the rear side of this silver film may be first covered by a thin transparent coating or film 13 of protective material such as transparent lacquer or shellac, and this protective coating may in turn be covered on its rear side by an opaque backing 14 of any desired color of paint, as shown in Fig. 2. This construction of mirror operates in substantially the same manner as that shown in Fig. 1 inasmuch as part of the light is reflected by the silver film and part of the light passes through the film and the protective coating 13 and is absorbed by the opaque backing 14, but the opaque backing is visible through the porous reflective film and operates in unison with the protective coating 13 to hold the reflective film in place.

Figure 3:
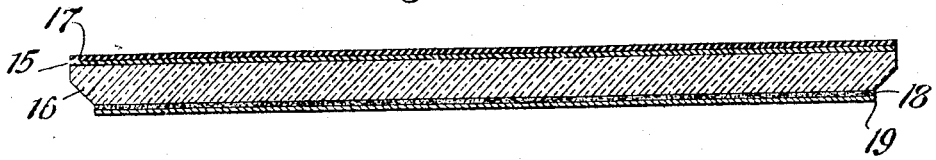
Figure 3 is a similar view showing still another way in which my invention may be carried into practical effect.

If desired, my invention may be embodied in a mirror in which some of the coatings are applied to the front side of the glass as well as the rear side of the same. A mirror of this form is shown in Fig. 3 and is constructed as follows:—

The numeral 15 represents a comparatively heavy coating of silver applied to the rear of the transparent body 16. A coat or backing 17 of any suitable character is applied to the rear of the silver coating 15 for the purpose of holding the latter in place and protecting the same against injury. To the front side of the glass body 16 is applied a film or coating 18 which is light porous or translucent so that it operates as a screen which will permit only part of the light to pass through and be reflected by the silver coating 15. This light porous film may be produced by a very thin coating of any suitable material and this is held in place on the glass plate 16 by applying to the front side of the light porous film 18 a transparent protective film or coating 19 such as clear shellac or lacquer.

In all the several forms of my invention a coating of light porous material is employed in connection with the glass plate which divides the light and causes only a part of the same to be reflected, thereby operating to reduce the glaring effect and increasing the safety of traffic on high-ways where such mirrors are now generally used.

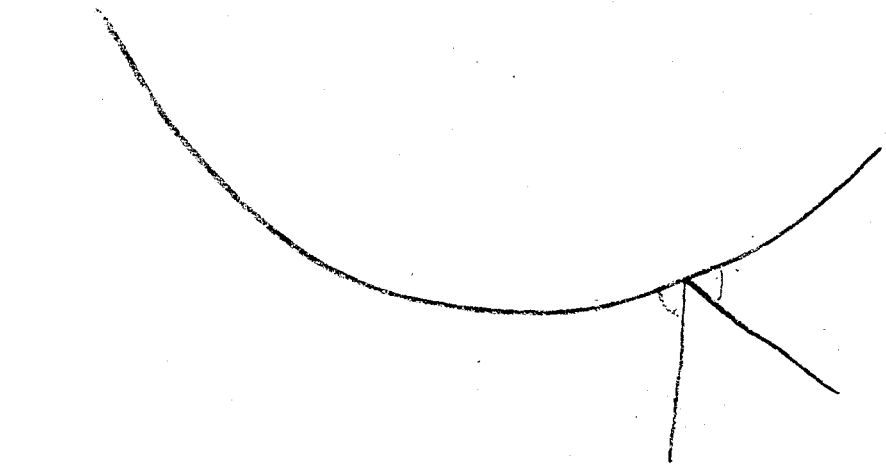

I claim as my invention:—

1. A mirror consisting of a transparent body, a coating of light porous silver applied to the rear of said body, and a coating of opaque material applied over said light porous silver.

2. A mirror consisting of a transparent body, a coating of light porous silver applied to the rear of said body, a coating of transparent protective material applied to the rear of said silver coating, and a coating of opaque material applied to the rear of said protective coating.

3. A mirror consisting of a transparent body, a coating of light porous reflective material applied to the rear of said body, and an opaque backing arranged in rear of said light porous coating.

4. A mirror consisting of a transparent body, a coating of light porous reflective material applied to the rear of said body, and an opaque backing arranged in rear of said light porous coating and showing through the latter.

In testimony whereof I hereby affix my signature.

WILLIAM LA HODNY.